United States Patent Office 2,803,645
Patented Aug. 20, 1957

2,803,645
STEROID INTERMEDIATES

Harold Hicks Zeiss, New Haven, Conn., assignor to Research Corporation, New York, N. Y., a corporation of New York No Drawing. Application December 6, 1954,
Serial No. 473,450

2 Claims. (Cl. 260—468.5)

This invention relates to new compounds useful in the production of steroids and to methods of making the same. More particularly, it relates to a new method of converting the isopropyl group of dehydroabietatic acid and its 8-nitro derivative to an acetyl group. Of particular utility is the methyl ester of 1,12-dimethyl-7-acetyl-8-nitro-9-keto-$\Delta^{6,8,13}$-octahydrophenanthrene - 1 - carboxylic acid:

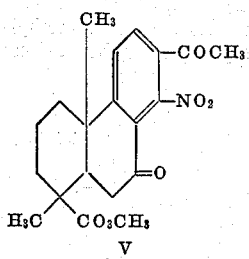

obtained from methyl 8-nitrodehydroabietate by the method of the invention.

The method briefly comprises the oxidation of dehydroabietic acid esters and the corresponding 8-nitro derivatives with chromic acid at 60–70° C.

Methyl 8-nitrodehydroabietate IV may be made from methyl dehydroabietate I, through the 6,8-dinitro compound II and 6-amino-8-nitro compound III by the following series of reactions:

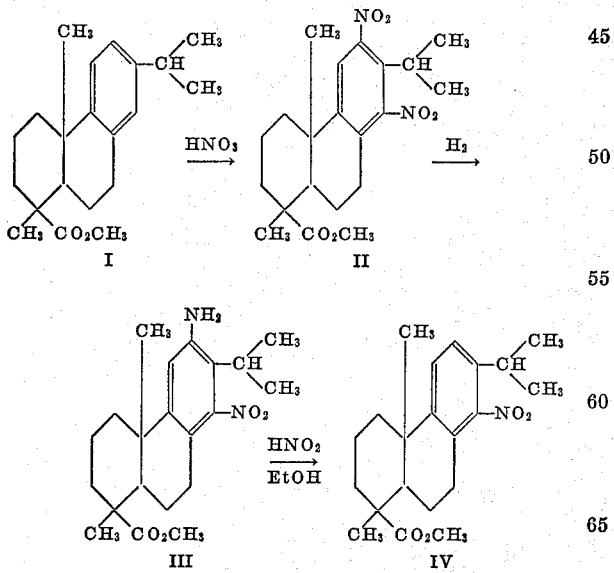

Compound V is subjected to the following series of reactions:

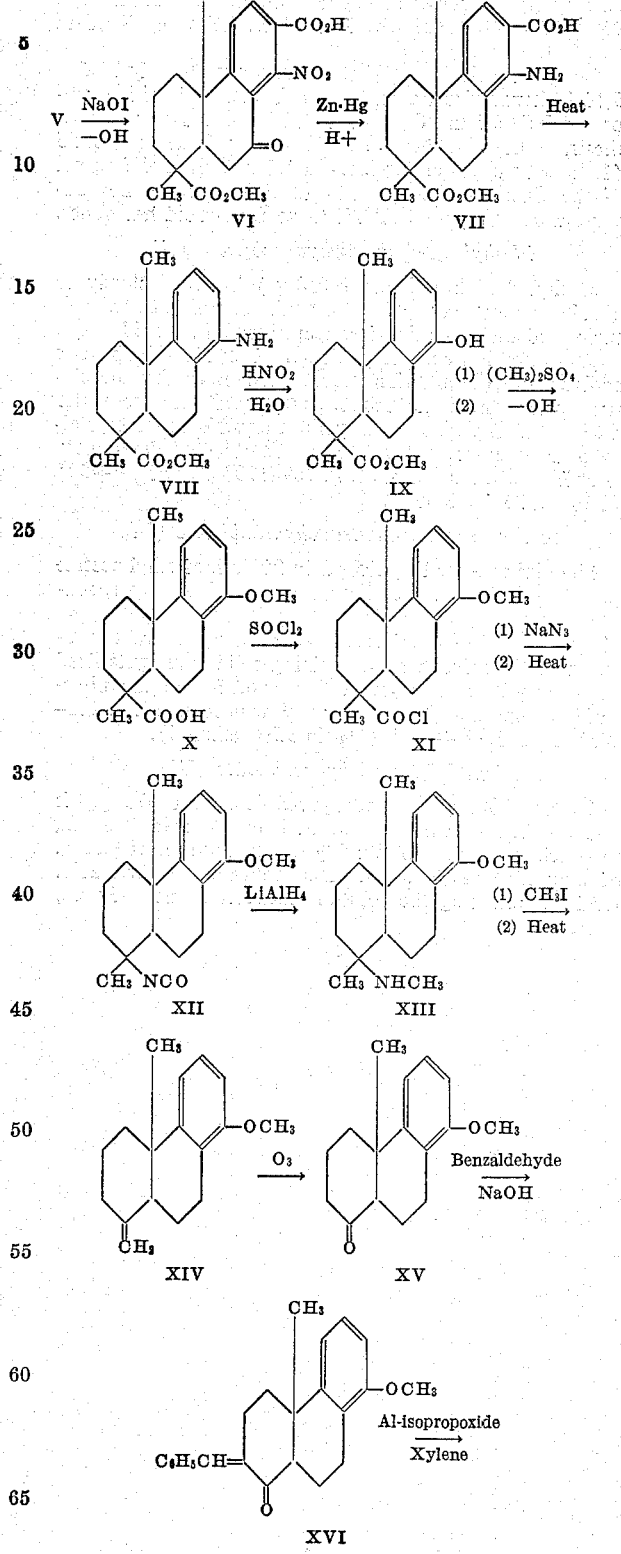

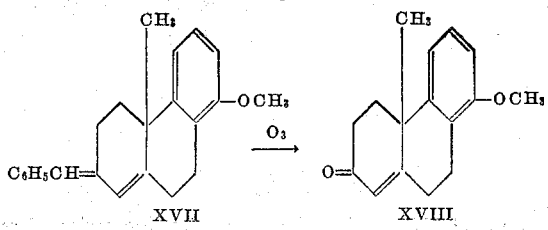

The reaction conditions for the production of compounds XI to XVIII are essentially those described for the corresponding dehydroabietene compounds in J. A. C. S. 75, 5935–5940 (1953) by Harold H. Zeiss and William B. Martin, Jr.

Compound XVIII (7-keto-1-methoxy-13-methyl-5,6,7,9,10,13-hexahydrophenanthrene) is identical with Compound VIII of the Cornforth and Robinson steroid synthesis, Journal of the Chemical Society (London), 1855 (1949), Conforth et al. (l. c.) and Cardwell et al. Journal of the Chemical Society, 361 (1953) describe the conversion of Compound XVIII to useful steroid hormones.

Methyl 6,8-dinitrodehydroabietate (II)

Methyl dehydroabietate I (10 g.) is added slowly to a cold mixture (0° C.) of 80 ml. of concentrated sulfuric acid and 40 ml. of concentrated nitric acid. The temperature is kept below 5° C. Considerable heat is evolved and the addition requires ten hours for completion, after which the mixture is poured into ice water during stirring. The pale yellow crystals are recrystallized from ether to give 10 g. (74.4%) of the dinitro ester II as white needles, M. P. 189–190° C., $[\alpha]_D^{20}$ +52° (2.5% in 95% ethanol).

Methyl 6-amino-8-nitrodehydroabietate (III)

The dinitro ester II (4.05 g.) in 200 ml. of ethyl acetate and 20 ml. of glacial acetic acid is catalytically hydrogenated in the presence of platinum oxide, absorbing 680 ml. of hydrogen (calcd. 672 ml.). After filtration and evaporation of the solvent, the remaining solid is recrystallized from ethyl acetate to give 3.6 g. (96.2%) of the nitroamino compound III as canary yellow needles, M. P. 241–243° C., $[\alpha]_D^{20}$ +102° (1% in 95% ethanol).

Methyl 8-nitrodehydroabietate (IV)

Methyl 6-amino-8-nitrodehydroabietate III (0.9 g.) is dissolved in 8 ml. of concentrated sulfuric acid at 0° C., to which is added with stirring a cold solution of 0.25 g. of sodium nitrite in 5 ml. of concentrated sulfuric acid. While maintaining the solution between 0 and −3° C., 24 ml. of sirupy phosphoric acid is added with stirring over a period of one hour. Stirring is continued for twenty minutes at 0° C. and the mixture is then poured into 150 ml. of ice and water, giving a precipitate of the white, crystalline diazonium salt which is filtered and washed with small quantities of cold water. Addition of this salt to ethanol produces an evolution of nitrogen with dissolution of the salt. After heating for a short time, the alcoholic solution is concentrated to give flat, light pale yellow plates. Recrystallization of these plates gives 0.56 g. (65.2%) of the 8-nitro ester IV as white plates, M. P. 192–193.5° C.; $[\alpha]_D^{20}$ +27° (1% in 95% ethanol).

Chromic acid oxidation of methyl 8-nitrodehydoabietate

Chromic acid (56 g.) is dissolved in 4 ml. of water and 100 ml. of glacial acetic acid. The solution is added dropwise to 3.6 g. of the nitro ester IV in 300 ml. of acetic acid while stirring at 70° C. for ten hours. The acetic acid is distilled off at the aspirator and after puffing the residue, 400 ml. of water, 25 ml. of concentrated sulfuric acid and 100 ml. of sulfurous acid is added. The mixture is thoroughly extracted with ether, and the combined ether extracts are washed with water. The ether layer is then extracted with 1% sodium hydroxide solution. The alkaline solution is freed of ether at the aspirator, cooled and neutralized with dilute hydrochloric acid. The amorphous precipitate (0.62 g.), recrystallized with 95% ethanol gives M. P. 164–166°.

I claim:

1. Lower alkyl esters of 1,12-dimethyl-7-acetyl-8-nitro-9-keto-$\Delta^{6,8,13}$-octahydrophenanthrene-1-carboxylic acid.

2. The methyl ester of 1,12-dimethyl-7-acetyl-8-nitro-9-keto-$\Delta^{6,8,13}$-octahydrophenanthrene-1-carboxylic acid of the formula

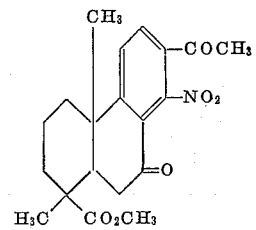

References Cited in the file of this patent
UNITED STATES PATENTS

| | | |
|---|---|---|
| 2,674,628 | Alt et al. | Apr. 6, 1954 |
| 2,703,809 | Ritchie | Mar. 8, 1955 |